United States Patent
Rosenbluth

(10) Patent No.: US 10,394,653 B1
(45) Date of Patent: Aug. 27, 2019

(54) COMPUTING IN PARALLEL PROCESSING ENVIRONMENTS

(71) Applicant: MellanoxTechnologies Ltd., Yokneam (IL)

(72) Inventor: Mark Rosenbluth, Uxbridge, MA (US)

(73) Assignee: Mellanox Technologies, Ltd., Yokneam (IL)

( * ) Notice: Subject to any disclaimer, the term of this patent is extended or adjusted under 35 U.S.C. 154(b) by 81 days.

(21) Appl. No.: 15/584,299

(22) Filed: May 2, 2017

(51) Int. Cl.
*G06F 11/14* (2006.01)
*G06F 11/30* (2006.01)
*G06F 15/80* (2006.01)

(52) U.S. Cl.
CPC ........ *G06F 11/141* (2013.01); *G06F 11/1474* (2013.01); *G06F 11/1479* (2013.01); *G06F 11/30* (2013.01); *G06F 15/80* (2013.01)

(58) Field of Classification Search
CPC ............... G06F 11/141; G06F 11/1474; G06F 11/1479; G06F 11/30; G06F 15/80
See application file for complete search history.

(56) References Cited

U.S. PATENT DOCUMENTS

| | | | | |
|---|---|---|---|---|
| 5,835,766 A * | 11/1998 | Iba | ........................ | G06F 9/466 718/104 |
| 6,430,657 B1 | 8/2002 | Mittal | | |
| 8,738,860 B1 * | 5/2014 | Griffin | ................ | G06F 12/0897 711/122 |
| 9,514,006 B1 * | 12/2016 | Busaba | ............... | G06F 11/0745 |
| 9,842,031 B1 * | 12/2017 | Kharatishvili | .... | G06F 17/30575 |
| 2001/0049714 A1 * | 12/2001 | Kikuchi | ............ | G06F 17/30171 709/201 |
| 2002/0172199 A1 | 11/2002 | Scott | | |
| 2004/0128472 A1 * | 7/2004 | Koyanagi | ........... | G06F 9/30036 712/4 |
| 2007/0203910 A1 * | 8/2007 | Ferguson | .......... | G06F 17/30575 |
| 2008/0183979 A1 | 7/2008 | Larson | | |
| 2011/0029498 A1 * | 2/2011 | Ferguson | ............ | G06F 16/2343 707/703 |
| 2013/0054852 A1 * | 2/2013 | Fuoco | ................. | G06F 13/4022 710/110 |
| 2013/0151750 A1 | 6/2013 | Kanigicherla | | |
| 2013/0339805 A1 | 12/2013 | Aho | | |
| 2013/0346708 A1 * | 12/2013 | Nashimoto | ............. | G06F 3/061 711/162 |
| 2014/0181323 A1 * | 6/2014 | Manula | ................. | G06F 3/0659 710/5 |
| 2015/0012713 A1 * | 1/2015 | Flanders | ............. | G06F 12/0831 711/146 |

(Continued)

*Primary Examiner* — Kyle Vallecillo
(74) *Attorney, Agent, or Firm* — Fish & Richardson P.C.

(57) ABSTRACT

A computing system comprises one or more cores. Each core comprises a processor. In some implementations, each processor is coupled to a communication network among the cores. In some implementations, a switch in each core includes switching circuitry to forward data received over data paths from other cores to the processor and to switches of other cores, and to forward data received from the processor to switches of other cores. Also discussed are techniques to add new capabilities to protocols, such as the CHI protocol to achieve "Total Store Order" (TSO) among multiple devices, such as PCI Express devices, in a cost effective manner.

18 Claims, 9 Drawing Sheets

(56) References Cited

U.S. PATENT DOCUMENTS

| | | | |
|---|---|---|---|
| 2015/0089509 A1* | 3/2015 | Brown | G06F 9/5016 718/103 |
| 2016/0378658 A1* | 12/2016 | Gschwind | G06F 12/0891 711/135 |
| 2016/0378659 A1* | 12/2016 | Gschwind | G06F 12/0833 711/135 |
| 2018/0117810 A1* | 5/2018 | Gschwind | A45D 40/00 |

* cited by examiner

COMPUTING IN PARALLEL PROCESSING ENVIRONMENTS

BACKGROUND

This description relates to computing in parallel processing environments.

FPGAs (Field Programmable Gate Arrays) and ASICs (Application Specific Integrated Circuits) are two exemplary approaches for implementing customized logic circuits. The cost of building an ASIC includes the cost of verification, the cost of physical design and timing closure, and the NRE (non-recurring costs) of creating mask sets and fabricating the ICs. Due to the increasing costs of building an ASIC, FPGAs became increasingly popular. Unlike an ASIC, an FPGA is reprogrammable in that it can be reconfigured for each application. Similarly, as protocols change, an FPGA design can be changed even after the design has been shipped to customers, much like software can be updated. However, FPGAs are typically more expensive, often costing 10 to 100 times more than an ASIC. FPGAs typically consume more power for performing comparable functions as an ASIC and their performance can be 10 to 20 times worse than that of an ASIC.

Multicore systems (e.g., tiled processors) use parallel processing to achieve some features of both ASICs and FPGAs. For example, some multicore systems are power efficient like an ASIC because they use custom logic for some functions, and reconfigurable like FPGAs because they are programmable in software.

One type of bus used in high speed computing is a high-speed serial computer expansion bus. One example is the Peripheral Component Interconnect Express standard, (PCIe) that is a replacement for the PCI bus standard. While the PCI bus standard is a shared parallel bus architecture, the PCIe bus is a point-to-point topology, with separate serial links connecting every device to a root host. Due to its shared bus topology, access to the older PCI bus is arbitrated (in the case of multiple masters), and limited to one master at a time, in a single direction.

SUMMARY

One of the requirements of the PCIe standard is that data written from devices to memory becomes visible to a reader device in the same order that the data was written. For example, if there are two items that are written to memory in the order item_a and item_b, a reader device should not get the new item_b followed by an older value of the item_a. This requirement is generally referred to as "Total Store Order" (TSO).

In high speed computing based on multicore system architectures, generally there are many caches and memory controllers. Communication between PCIe devices and those memory controllers is done using a communication protocol typically governed by an underlying processor architecture. For example, one such architecture is the ARM® (ARM, LIMITED) architecture. ARM uses a coherent hub interface (CHI) protocol. CHI, as specified, can achieve TSO from a single PCIe device. However, for multicore system architectures that use multiple PCIe devices, without special handling, an improper read order would be possible.

The discussion below adds new capabilities on top of protocols, such as the CHI protocol to achieve TSO among multiple devices, such as PCIe devices, in a cost effective manner.

According to an aspect, a compute node includes a multicore processor device including a plurality of cores, with multiple ones of the plurality of cores each including a processor and switching circuitry configured to couple the processor to a network among the plurality of cores. The compute is node configured to detect presence of a potential deadlock condition between a device that communicates with a node over a serial peripheral interconnect, and memory, generate by the node in response to the detection of the potential deadlock condition, a transaction to cause the device to rollback all write transactions that are currently in progress at the serial peripheral interconnect to temporarily remove the writes from the serial peripheral interconnect and cancel the rolled back write transaction.

The process can be implemented over the existing CHI protocol to possibly avoid deadlock between a PCIe device and memory agents. By recognizing patterns that can give rise to deadlock a process can detect potential deadlock conditions, i.e., detecting a set of conditions which if not handled or resolved will likely result in a deadlock.

Other features and advantages of the invention will become apparent from the following description, and from the claims.

DESCRIPTION

1 Exemplary System Overview

The system described in this section (with reference to FIGS. 1A and 1B) provides an overview of various aspects of a parallel processing environment that can be used for a variety of the techniques described in other sections.

A multicore processor can be manufactured as a chip containing multiple processing engines or cores. Using multiple cores to process applications can provide greater computing throughput and also lower power. There are many challenges to building a multicore processor. These include the challenges of how to connect the cores to each other efficiently, how to manage data sharing between the cores, how to supply data from input-output devices to the cores in a coherent manner, and how to construct operating systems for multicore processors. Bus based multicore chips use a bus to connect the cores, but buses may be a throughput bottleneck and may also consume a lot of power. An alternative way to connect the cores is to use a point-to-point network such as a mesh network or a ring network. Networks such as a mesh have switches arranged in a grid pattern in which neighboring switches are connected to each other. When the cores include a switch component for a network such as a mesh, the cores can be laid out in a simple rectangular tiled pattern. Such multicore chips are called tiled multicore processors. Because the conductor paths are short in tiled multicore processors, signals can travel short distances when neighboring cores need to communicate. Tiled multicore processors generally consume lower power than bus based multicore processors.

Figure 1A:
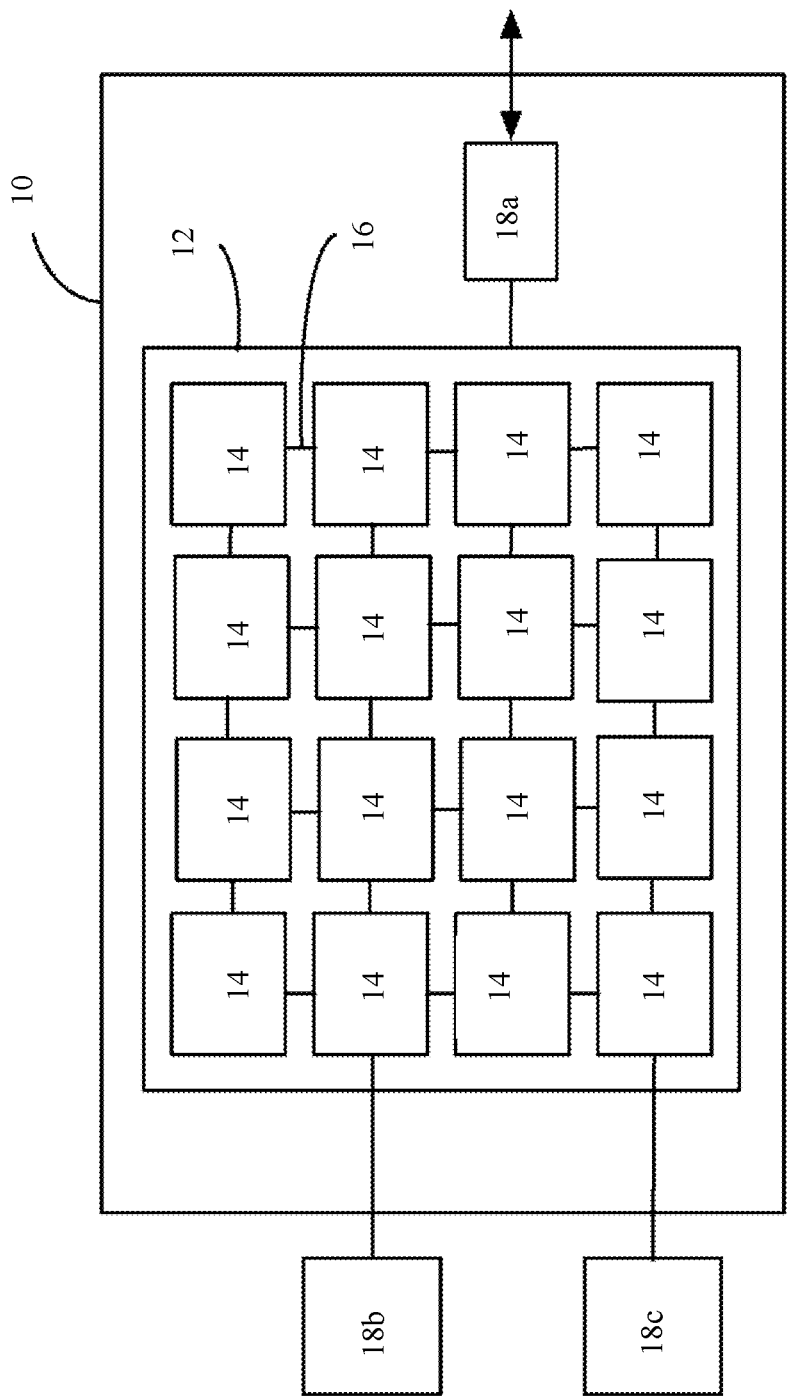
FIG. 1A is a block diagram of a tiled integrated circuit.

Referring to FIG. 1A, an integrated circuit 10 (or "chip") includes an array 12 of interconnected tiles 14. Each of the tiles 14 is a functional unit that includes a processor (or "processor core") and a switch that forwards data from other tiles to the processor and to switches of other tiles over data paths 16. The switch is coupled to the processor so that data can be sent to or received from processors of other tiles over the communication fabric formed by the switches and data paths. The integrated circuit 10 includes other on-chip circuitry such as input/output (I/O) interface circuitry to couple data in and out of the circuit 10, and clock distribution circuitry to provide clock signals to the processors of the tiles.

The integrated circuit 10 shown in FIG. 1A includes a two-dimensional array 12 of (e.g., rectangular) tiles 14 with data paths 16 between neighboring tiles to form a mesh network. The data path 16 between any two tiles can include multiple conductor paths (or "wires") to support parallel channels in each direction. Optionally, specific sets of conductors between two tiles can be dedicated to different mesh networks that can operate independently.

Alternative network configurations include buses, rings, crossbars, hypercubes, trees, or networks having paths that extend to diagonal neighbors or to tiles that are multiple rows or columns away. Other configurations include higher dimensional mesh topologies. For example, multiple layered integrated circuits or other three-dimensional configurations can be used to form networks in which the connections form a cube of network nodes. In some implementations, a switch coupled to a processor forwards data to and from the processor or between neighboring processors over data paths of a one-dimensional interconnection network such as ring network.

The data paths 16 from one or more tiles at the edge of the network can be coupled out of the array 12 of tiles 14 (e.g., over I/O pins) to an on-chip device 18a, an off-chip device 18b, or a communication channel interface 18c, for example. Multiple conductors of one or more parallel channels can be multiplexed down to a fewer number of pins or to a serial channel interface. For example, the conductors for one or more channels can be multiplexed onto a high-speed serial link (e.g., SerDes) or a memory controller interface (e.g., a memory controller for DDR or Dynamic RAM —also known as DRAM). The memory controller can be implemented off-chip or in logic blocks within a tile or on the periphery of the integrated circuit 10.

The following exemplary implementations are described in the context of tiles that have the same structure and functionality. Alternatively, there can be multiple "tile types" each having different structure and/or functionality. For example, tiles that couple data off of the integrated circuit 10 can include additional circuitry for I/O functions.

Figure 1B:
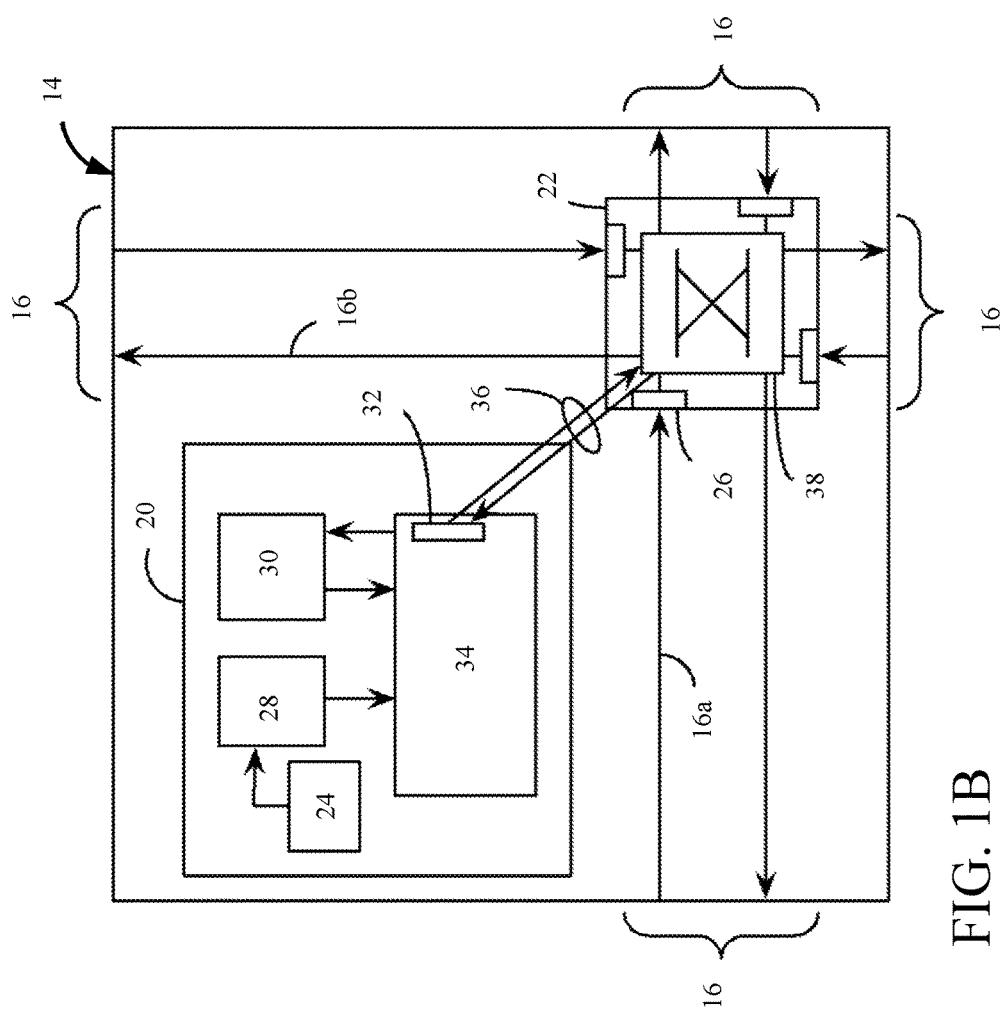
FIG. 1B is a block diagram of a tile.

Referring to FIG. 1B, a tile 14 includes a processor 20, a switch 22, and sets of incoming conductors 16a and outgoing conductors 16b that form the data paths 16 for communicating with neighboring tiles. The processor 20 includes a program counter 24, an instruction memory 28, a data memory 30, and a pipeline 34. The processor 20 can use any of a variety of pipelined architectures. The pipeline 34 includes pipeline registers, functional units such as one or more arithmetic logic units (ALUs), and temporary storage such as a register file. The stages in the pipeline 34 include, for example, instruction fetch and decode stages, a register fetch stage, instruction execution stages, and a write-back stage.

Either or both of the instruction memory 28 and data memory 30 can be configured to operate as a cache for off-chip memory. The cache hierarchy can take many forms, and the description here is just one example. For example, the instruction memory 28 includes an instruction cache that caches instructions, which can be a level 1 instruction cache (L1I), and the data memory 30 includes a data cache that caches data, which can be a level 1 data cache (L1D). Both the L1I cache and the L1D cache can be backed up by a level 2 unified cache (L2U) that is usually larger in size than either of the L1 caches. The caches are controlled by a cache controller.

On a cache miss from the L1I or L1D caches, the L2U cache is checked. If the data is found in the L2U cache, then a cache miss can be averted. If the instruction or data is not found in the L2U, then the instruction or data is fetched from outside the tile. In some implementations, the processor checks the cache in another tile called the home tile for that particular address that missed. This way, the L2U caches in the other tiles serve as a large distributed L3 cache. In other implementations the L2 cache need not be the cache at the home. If the home tile has an entry for the data item (within a home location of a home cache in the home tile), the home tile can supply the data item to the requesting tile. If even the home tile causes a cache miss, then, as an example, the home tile handles the cache miss by sending the cache request to external memory (to DRAM typically) and obtains the data item from the external memory. The cache miss from the requesting tile gets turned into a message that traverses the network to get to the home tile. Similarly, the miss from the home tile to DRAM traverses the network.

Sometimes, instead of checking a home tile on a cache miss to the cache within a tile, the request is sent directly outside the chip to external DRAM memory.

The tile 14 can also include a cache controller that performs actions to ensure that cache coherence is maintained in the whole chip. Typically, the cache coherence information for a given cache line is maintained at the home tile for that cache line. The coherence information is stored in a directory to store the current state of the cache line. The home location for a given cache line is stored in a structure that performs physical address to home location translation such as a System Address Map (SAM) used in the ARM® (ARM, LTD) architecture. The home location, within a home tile, for a given cache line can also be determined by hashing the cache line address to yield a home location. The home location can also be modified as the program executes. Data that has a home location in a home cache of a particular home tile is said to be "homed in" that particular tile.

The processor 20 can be multithreaded and/or have capabilities of a Very Long Instruction Word (VLIW) processor, a superscalar processor, or a vector processor.

Together the switches 22 in a multicore chip provide the communications infrastructure for all the cores. Switches can be built in many ways. As one example, the switch 22 includes input buffers 26 for temporarily storing data arriving over incoming conductors 16a, and switching circuitry 38 (e.g., a crossbar fabric) for forwarding data to outgoing conductors 16b or the processor 20. The input buffering provides pipelined data channels in which data traverses a data path 16 from one tile to a neighboring tile in predetermined number of clock cycles (e.g., a single clock cycle). This pipelined data transport enables the integrated circuit 10 to be scaled to a large number of tiles without the need to limit the clock rate to account for effects due to conductor lengths such as propagation delay or capacitance. (Alternatively, the buffering could be at the output of the switching circuitry 38 instead of, or in addition to, the input.)

A tile 14 controls operation of the switch 22 using either the processor 20, or separate switch processor dedicated to controlling the switching circuitry 38. Separating the control of the processor 20 and the switch 22 allows the processor 20 to take arbitrary data dependent branches without disturbing the routing of independent messages passing through the switch 22.

In some implementations, the switch 22 includes a switch processor that receives a stream of switch instructions for determining which input and output ports of the switching circuitry to connect in any given cycle. For example, the switch instruction includes a segment or "sub-instruction" for each output port indicating to which input port it should be connected. In some implementations, the processor 20 receives a stream of compound instructions with a first instruction for execution in the pipeline 34 and a second instruction for controlling the switching circuitry 38.

The switch instructions enable efficient communication among the tiles for communication patterns that are known at compile time. This type of routing is called "static routing." An example of data that would typically use static routing are operands of an instruction to be executed on a neighboring processor.

The switch also provides a form of routing called "dynamic routing" for communication patterns that are not necessarily known at compile time. Dynamic routing is also used for messages that result from cache misses or other cache coherence related transactions. In dynamic routing, circuitry in the switch 22 determines which input and output ports to connect based on header information in the data that is being dynamically routed during execution. A tile can send a message to any other tile by generating the appropriate address information in the message header. The tiles along the route between the source and destination tiles use a predetermined routing approach. For example, one routing approach is shortest Manhattan Routing (also known as dimension-ordered routing), which refers to routing along a first dimension followed by a second perpendicular dimension (where the distance between two points is measured by adding line segments that are arranged in a grid like pattern, with the line segments at right angles to each other, and not the straight line joining the two points). The number of hops along a route is deterministic but the latency depends on the congestion at each tile along the route. Examples of data traffic that would typically use dynamic routing are memory access traffic (e.g., to handle a cache miss) or interrupt messages.

The switch 22 includes dedicated circuitry for implementing each of these static and dynamic routing approaches. For example, each tile has a set of data paths, buffers, and switching circuitry for static routing, forming a "static network" for the tiles; and each tile has a set of data paths, buffers, and switching circuitry for dynamic routing, forming a "dynamic network" for the tiles. In this way, the static and dynamic networks can operate independently. A switch for the static network is called a "static switch"; and a switch for the dynamic network is called a "dynamic switch." There can also be multiple static networks and multiple dynamic networks operating independently. For example, one of the dynamic networks can be reserved as a memory network for handling traffic between tile memories, and to/from on-chip or off-chip memories. Another network may be reserved for data associated with a "supervisory state" in which certain actions or resources area reserved for a supervisor entity.

The switch 22 is coupled to the processor 20 over processor coupling wires 36. For fast (e.g., low latency) communication between tiles of neighboring processors, the coupling wires 36 are integrated directly into the pipeline 34. The processor 20 communicates with the switch 22 using distinct opcodes to distinguish between accesses to the static and dynamic network ports. Alternatively, the instructions can use register names to refer to switch ports. For example, the processor can send or receive data by writing to or reading from a register interface that is directly mapped to the input buffers 26 of the switch 22. For data going to or coming from the processor 20, a switch instruction indicates that the switch 22 should couple data to or from a selected register or bypass path of the pipeline 34 over a register mapped pipeline integrated switch interface 32. This pipeline integration allows data to be available to the switch 22 the moment an instruction is executed and the register value is available. In the next cycle the same data could appear at an input buffer of another tile.

To improve the latency of dynamic routing switches the tiles can use route prediction in the switches. With route prediction, a message that comes into an input port of the switch is routed to a given destination port of the switch based on a predicted port number. The prediction for a packet coming in from a given input port can be selected based on the route taken by the previous packet from that input port. If the hardware in the tile (e.g., prediction circuitry) determines that the prediction was incorrect, the hardware can take a few extra cycles to make the right routing decision based on the information in the packet header.

Other optimizations include using wide network channels. A tile can send single word messages containing both the packet header and the data value. The packet header includes information such as route information.

A tile 14 can include various types of memory modules to serve as the instruction memory 28, data memory 30, or as a local memory store for other types of information such as control information for the tile. There can be a small SRAM bank in each tile in addition to a large SRAM bank. There can also be a larger DRAM bank in each tile. Each tile can have mode indicators used to select among these banks. Any of the memory modules can be treated as a cache for a larger memory store outside the tile 14 or the integrated circuit 10. Such external memory (e.g., DRAM) is accessible over high bandwidth paths of one or more dynamic networks. The amount of memory can be chosen to roughly balance the areas devoted to processing and memory, and to match the memory access time and the processor clock.

Functions such as virtual address translation, caching, global shared memory and memory protection can be implemented by any combination of hardware and software (e.g., processor instructions). A tile 14 can include a translation lookaside buffer (TLB) to translate virtual addresses as they come out of the processor 20 on each tile 14. Separate TLBs for instruction and data can also be used. A mode bit for each can turn off translation. Events such as cache miss or translation fault can trigger a trap or interrupt to the processor 20, so that the processor 20 can handle the event in software (using instructions executed by the processor).

The software running on the processor 20 can also use various mechanisms to speedup TLB miss handling. For example, a software TLB miss handler can also maintain a software cache of TLB entries. This software cache used by the software TLB miss handler is also called a TSB.

For example, there can be multiple trap lines (conductors carrying trap signals) to the processor 20. Alternatively, there are few trap lines, but there is a trap vector that the processor 20 can access which encodes the type of trap that occurred. There is a mode indicator, which can allow selecting whether the software or the hardware handles these events. A hardware cache tag file can export a hit/miss status to the software rather than stalling the processor pipeline.

An array 12 of tiles 14 can include one or more interface modules coupled to a switch on the periphery of the array to transfer data to and from an external device such as an I/O device. The interface module includes circuitry to mediate between the communication protocols of the dynamic networks and a communication protocol of the external device. An interface module is able to connect to ports of any of the dynamic network switch points on a tile, but any given interface module may only be connected to a subset of the dynamic networks through a subset of the switch points.

The configuration of the circuitry in a tile 14 can be controlled by local control information stored in the tile. For example, a module in the tile can be turned on or off (to save power for example) or configured into a variety of modes (e.g., to set protection levels) based on the state of a "mode indicator" (e.g., one or more bits) stored in a register or other memory store.

Various parts of the multicore chip, for example, a tile, a processor in a tile, a processor and caches in a tile, can also be selectively shut off to save power. When doing so, the system takes care to selectively shut off or activate certain parts of the tile that are needed for other parts of the system to operate. For example, if a tile's cache is the home cache for a given set of cache lines, then that tile's cache controller and cache might be powered up. Alternatively, they might take a set of actions before they are powered down. These actions can transfer responsibility of processing to other parts of the chip.

As line rates of traffic increasingly rise, it is often not possible to timely execute all of the required applications completely in software. For such cases, a processor 20 can include accelerator circuitry to speedup processing for special functions such as security, compression, network packet processing, etc. The accelerator circuits (accelerators) can be connected directly to a tile or a core, or they can be connected to the periphery of an interconnection network (for example, like an I/O device). The accelerators can also be full participants in coherence protocols and can contain caches. They can also use cache coherence transfers to transfer data between them and the other cores, or they can use DMA (direct memory access) to transfer data from the caches on the rest of the chip to the accelerator memory or caches.

In this situation, it is useful to support a unified interface to the accelerators, such as in a MiCA interface (multicore interface for coprocessor acceleration). MiCA like interfaces can support direct transfer of data from the chip's caches to the accelerators. The accelerators can also be virtualized so that more cores can access the accelerators than there are accelerators.

Accelerators often have a queue of requests from processors (or cores or tiles). They can perform the operations requested in the requests in the order in which the requests were received (for example).

A software system for the tiled integrated circuit 10 includes a compiler that is able to schedule instructions for the processors in each of the cores. The compiler can also prepare communication over the static network, or messages to be sent over the dynamic network.

An exemplary operating system (OS) for the integrated circuit 10 can include a Linux-like kernel or a similar kernel running on a single tile 14. The OS can be a symmetric multiprocessing OS such as SMP Linux which can run on one or more tiles. Threads of SMP Linux running on multiple tiles communicate with each other through coherence shared memory. Alternatively, the OS can be a distributed OS running on multiple tiles sending messages to each of the processes on each of the tiles.

Another software system component that can be included is a hypervisor layer that provides physical device drivers for each physical device. The hypervisor also sets protection levels in the hardware. The hypervisor is responsible to multiplex various operating systems on the physical hardware and physical devices.

Application writers can program each of the cores or tiles in the multicore chip using languages such as C. Similarly, they can program multiple tiles by writing parallel programs using libraries such as pthreads, Message Passing Interface (MPI), or parallel languages such as OpenMP.

The software system can also include libraries that provide additional function such as interfaces that allow the user to access various hardware features directly, such as the registers related to the network, special purpose registers, synchronization operations, user-level message passing, etc.

Various performance enhancements can be made to the distributed cache coherent environment for a multicore processor system. The caches with associated cache controllers contained in the cores (or tiles) form a larger shared cache system for the memory references to an external memory from any of the cores. In other words, a union of all caches (for example, Level 2 caches) in the system serves as a higher level unified cache (for example, level 3 cache). The cache controllers handle cache access and maintain coherence among caches of different cores. Latency reduction techniques for the larger shared cache system are applied to further optimize the memory operation performance. Several features also enable the software executing on the processors of the cores to control cache partition and utilization from the processor and the I/O system while maintaining coherence.

2 CHI Protocol to Achieve TSO Among Multiple PCIe Devices

Figure 2:
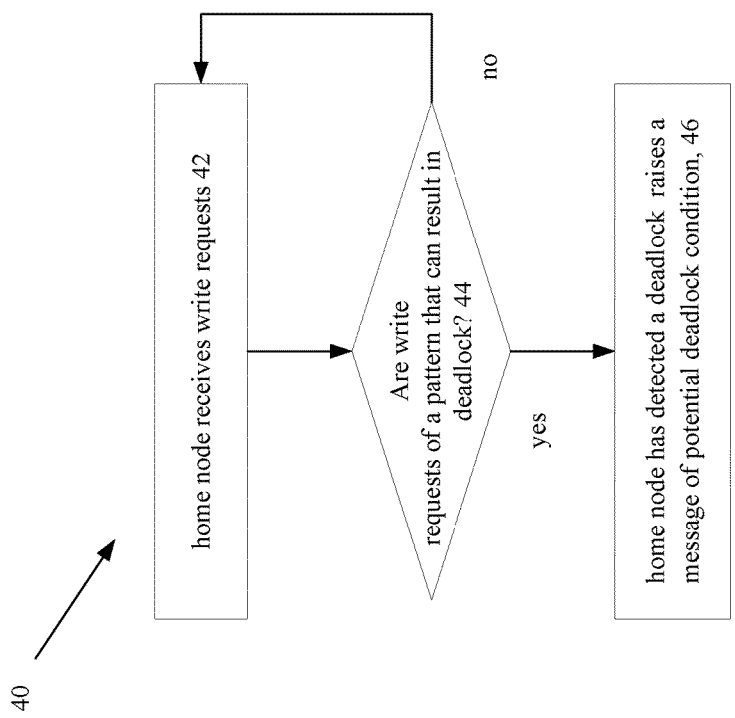
FIG. 2 is a flowchart of a method for deadlock detection.

Referring now to FIG. 2, with the existing CHI protocol, it is possible for a PCIe device and memory agents to deadlock. Patterns that can give rise to deadlock include those specific patterns of write transactions to specific addresses in memory, which write transactions are received by memory and the memory is access via a home node, e.g., a tile 14 from different PCIe devices.

A process 40 to detect a potential deadlock condition is shown. By detection of a potential deadlock condition is meant detecting a set of conditions which if not handled or resolved will likely result in a deadlock, it being understood that not in all instances will the set of conditions actually result in a deadlock, i.e., there could be some false positive detections. A home node for a memory detects deadlocks. The data could reside in memory or cache. The home node for a memory address receives 42 write requests. The process 40 determines 44 if the write requests meet a known set of write patterns that could cause a deadlock. Two of such patterns are discussed in FIG. 3A, e.g., allow writes to become visible in reverse order and which would be inconsistent with an interconnect standard or FIG. 3C below, which originate from plural, different PCIe devices with addresses to specific memory locations, etc. Other sets of conditions could be observed. Detecting of a potential deadlock with memory agents is based on write transactions received at the home node. Generally, the detected deadlock situation conditions are those that result in write transactions being pended, that is, the write transactions are waiting for a reply that is dependent itself on an unrelated reply. For example, the process of FIG. 2 can detect any of the scenarios given in FIG. 3 (illustration of two writes with no ordering enforced or FIG. 5.

In this detecting scheme, detecting these write transactions is used as a proxy for detecting deadlock caused by write transactions to memory. Upon detection of such a pattern, the home node signals, e.g., sends a message 46 of a potential deadlock condition. The contents of the rollback message includes a Transaction ID of the write that is involved in the potential deadlock. The PCIe device uses that ID to recognize which transactions have to be removed from the system. In essence, the HNF home node, full (referred to as HN-F in the ARM specification) detects potential ordering issues and (along with a requesting node RN that does not cache data (referred to as an RND or RN-D in the ARM specification) rolls back writes in flight to enforce legal ordering.

Figure 3:
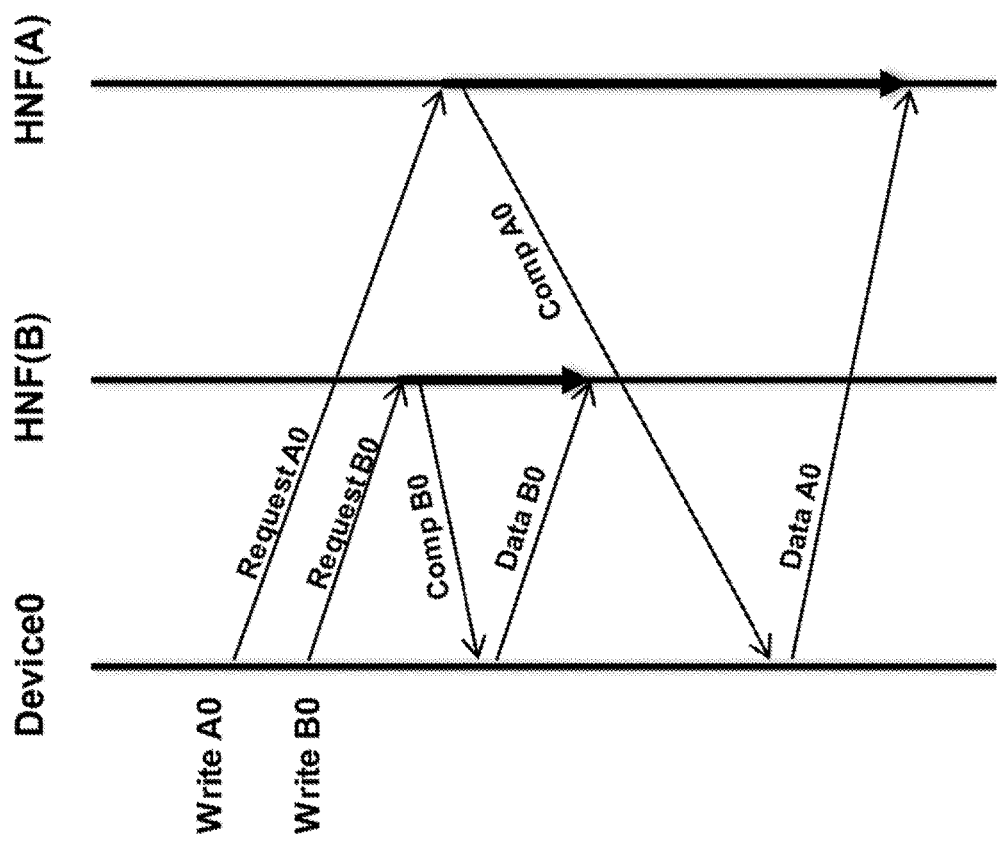
FIGS. 3, 4, 5 and 7 are charts depicting messaging orders.

Referring now also to FIG. 3, where a relaxed order model for handling write operations from non-TSO devices is shown. This model allows writes to different addresses to become visible in reverse order. One example of a relaxed order model can be found in the ARM architecture. However, a relaxed order model that would allow writes to different addresses to become visible in reverse order is not consistent with PCIe ordering rules. While TSO writes can be achieved by performing writes one-at-a-time, meaning that a subsequent write cannot be performed until a previous write is acknowledged at the point of serialization, such an arrangement would have adverse impacts on performance, as it would be desirable to pipeline write operations.

Figure 4:
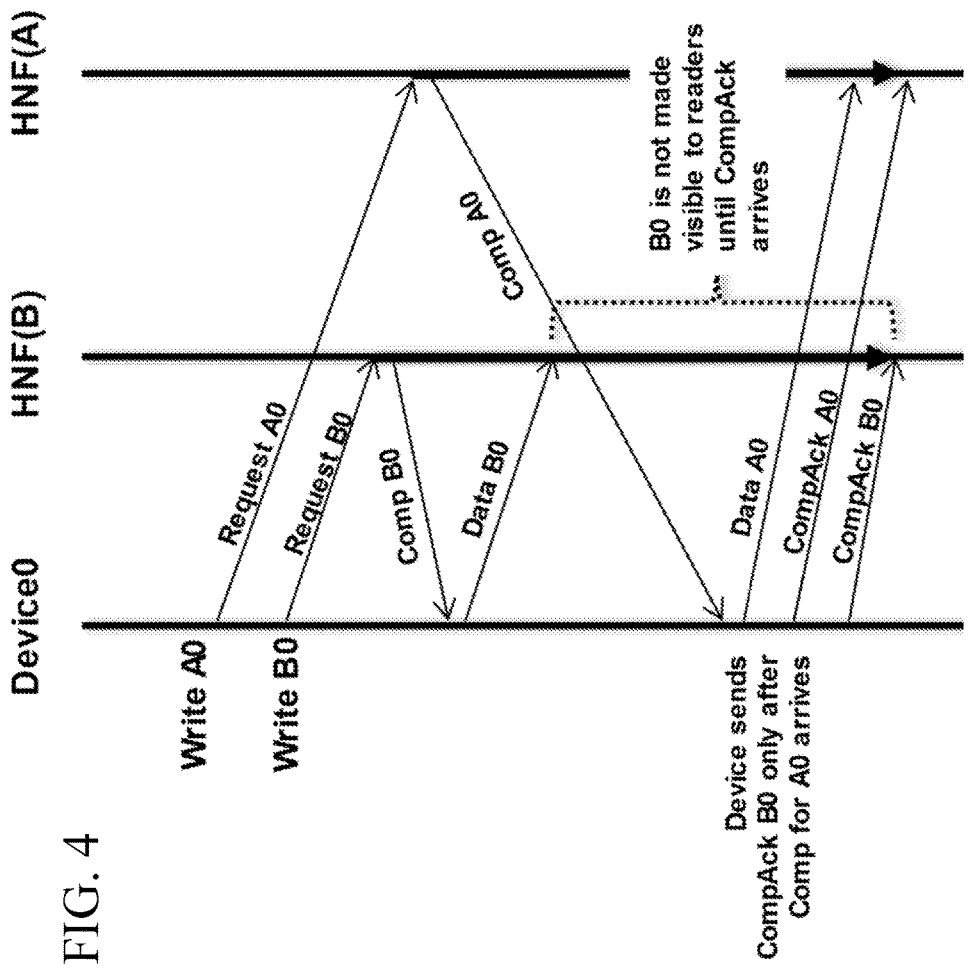

Referring now to FIG. 4 which shows ARM CHI protocol support for TSO. The CHI protocol adds an additional message, "CompAck." With respect to a new write, this is an acknowledgment message that, e.g., a PCIe device sends only when all previous writes (in reference to the new write) have completed. The use of CompAck delays visibility of the new write until all previous writes are also visible. However, the CHI protocol does not support TSO ordering across more than one PCIe device. Using the CHI for multiple PCIe devices can lead to a deadlock.

Figure 5:
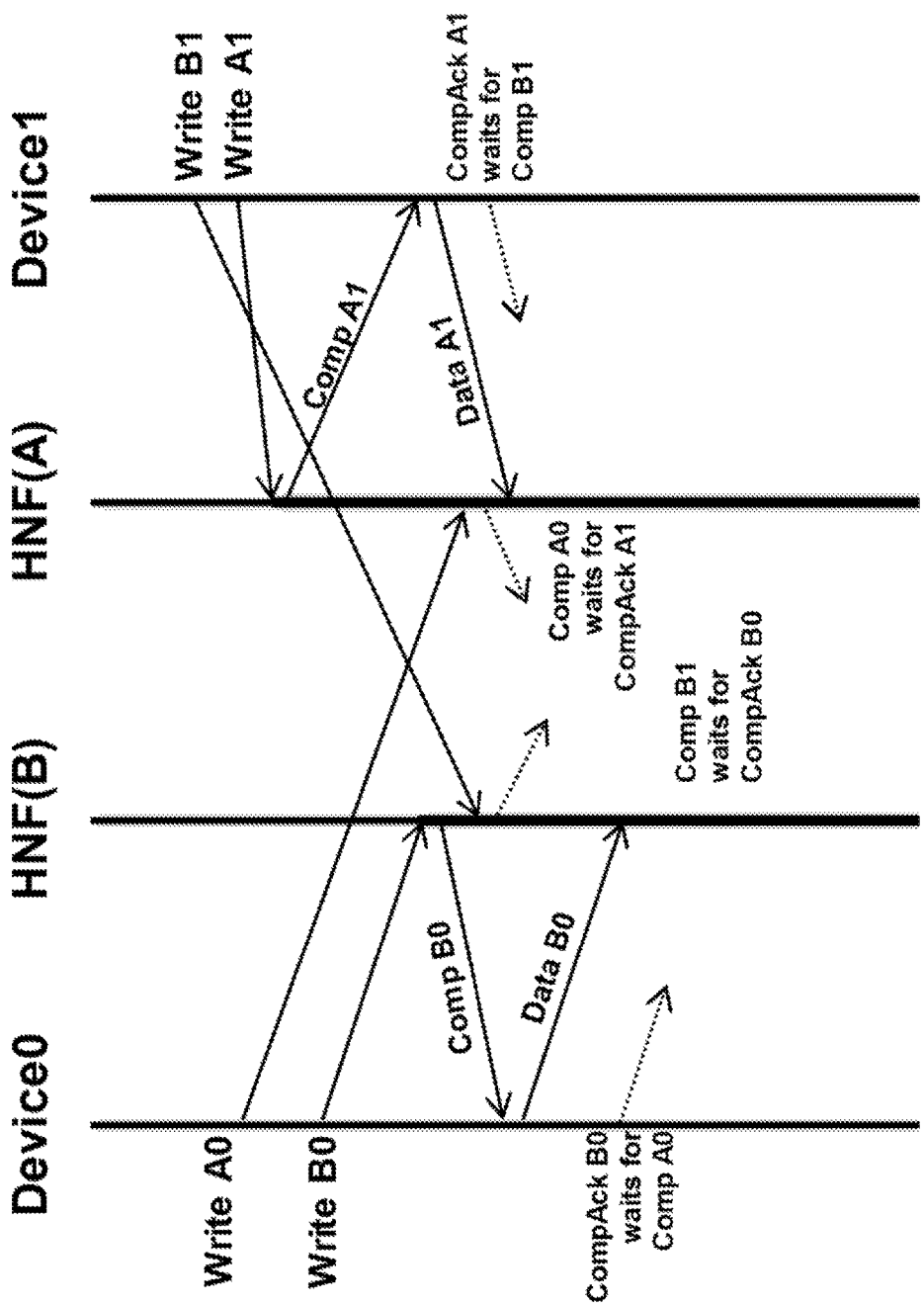
Figures 5A, 7A:
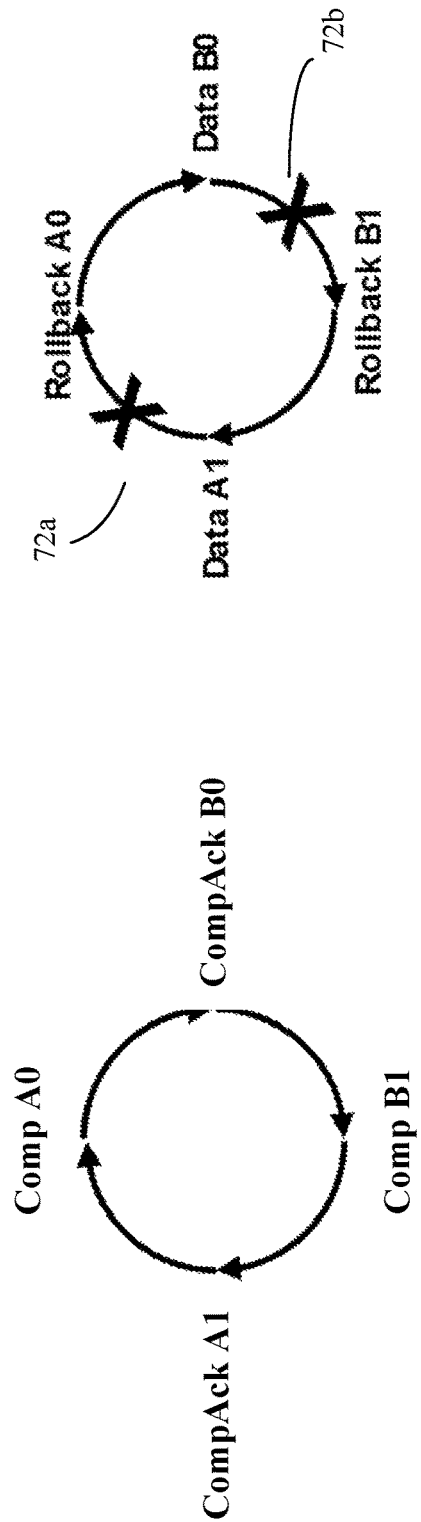
FIGS. 5A and 7A are diagrams applicable to aspects of FIGS. 5 and 7, respectively.

Referring now to FIG. 5, deadlock can occur with the CHI protocol with multiple PCIe devices. In FIG. 5, the order of writes by two, e.g., a PCIe devices (represented by Device0 and Device1 more generally two TSO devices), is taken from the ordering example of FIG. 4. Transaction A0 arrives at a home node (HNF), e.g., HNF(A) later than Transaction A1. Transaction B1 arrives at HNF(B) later than transaction B0, e. g., the order of issue at device may differ from the order of arrival at HNF due to variable delays in the network. Device will send CompAck for a write only when all older writes have sent corresponding CompAcks. However, a CompAck can only be sent after Comp has been received. This situation can lead to a circular dependency as depicted in FIG. 5A, where the device can send CompAck B0 only after Comp B1 has been received and the device can send a CompAck A1 which is waiting for Comp A0. The implied convention of the directed line is event at head of arrow is waiting for event at tail of arrow.

In a deadlock situation, each of these transactions is waiting for a reply to complete the transaction. However, the reply that each transaction is waiting for is dependent itself on an indirectly related or unrelated reply. This pattern of dependencies results in a deadlock situation.

Figure 6:
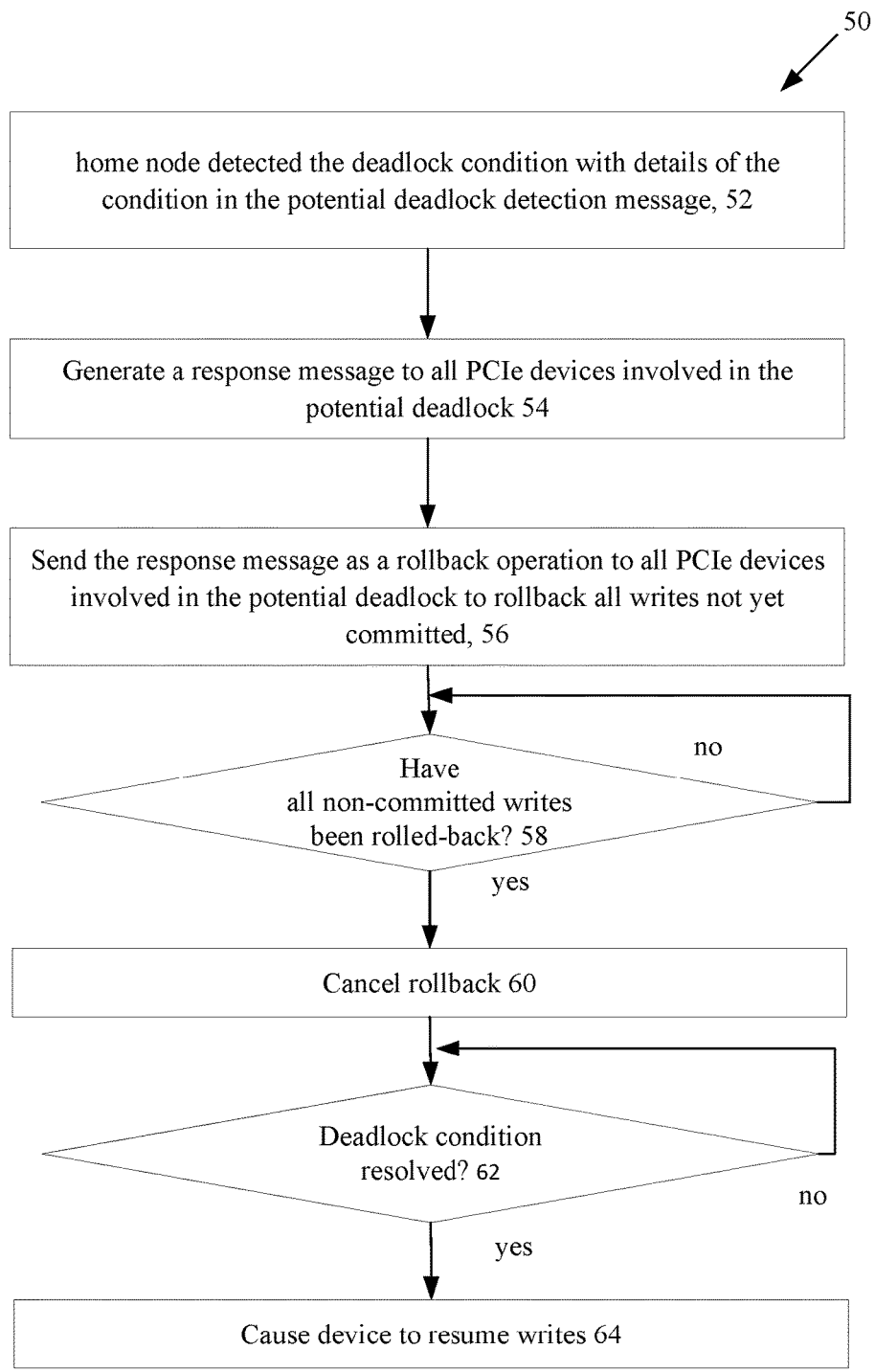
FIG. 6 is a flowchart for providing total store order among plural PCIe devices.

Referring now to FIG. 6, an example of a special handing procedure 50 for ensuring total order store for a multi-core system using the PCIe bus is shown. The special handing procedure 50 receives the detection of the potential deadlock as discussed in FIG. 2. Upon detecting of a deadlock, the special handing procedure 50 generates 54 as a response message, a rollback message that is sent 56 to the PCIe device to indicate to the PCIe device that the potential deadlock has been detected. In response to this message the PCIe device executes a "rollback" transaction to roll back all write transactions in progress (i.e., not committed). The roll back temporarily removes those write transactions from the system. These transactions can remain buffered, for example, the transaction can remain in a home node's request buffer until they are re-sent to memory and replayed in more favorable ordering. In one implementation, the write requests are removed from home node and saved in PCIe controller to be replayed. In another implementation the write requests could be removed from the PCIe controller and saved in the home node to be replayed. In the discussion below, the PCIe device requesting node RN remembers the write transactions. The Rollback transaction is a mechanism discussed herein that when used with PCIe controller can overcome potential deadlock or deadlock situations. The off-chip PCIe device has posted, the write transactions and is done. The PCIe controller (on-chip) keeps the information of the write transaction, (e.g. write addresses, data, etc.) until the data are written to memory.

Upon removing all of the write transactions 58, from the HNF, the special handing procedure cancels 60 the rollback write transaction to resume operation without the presence of the deadlock conditions. One technique to cancel the rollback write includes sending a "null write" transaction or operation to the memory. This is a convenient implementation so that operation flow is the same as a "normal" write transaction (not deadlocked) so, that only byte enables on the write transactions have to change. The "null write" transaction (or operation) is a transaction that effectively completes a write transaction without actually modifying any data in memory.

The process waits 62 for the deadlock conditions to be resolved, e.g., by the node or the PCIe device, such as by replaying the oldest write operation. No writes need to be re-ordered. Once the deadlock is resolved, the oldest write is replayed and at that point it is guaranteed to complete because it is oldest. Once the deadlock has been resolved, the node causes 64 the device to resume the reordered write operations. After rollback, all nodes make progress by emitting one request (e.g. the oldest) in the deadlock free mode. Because the request emitted is oldest, the request is guaranteed to complete w/o dependencies.

Figure 7:
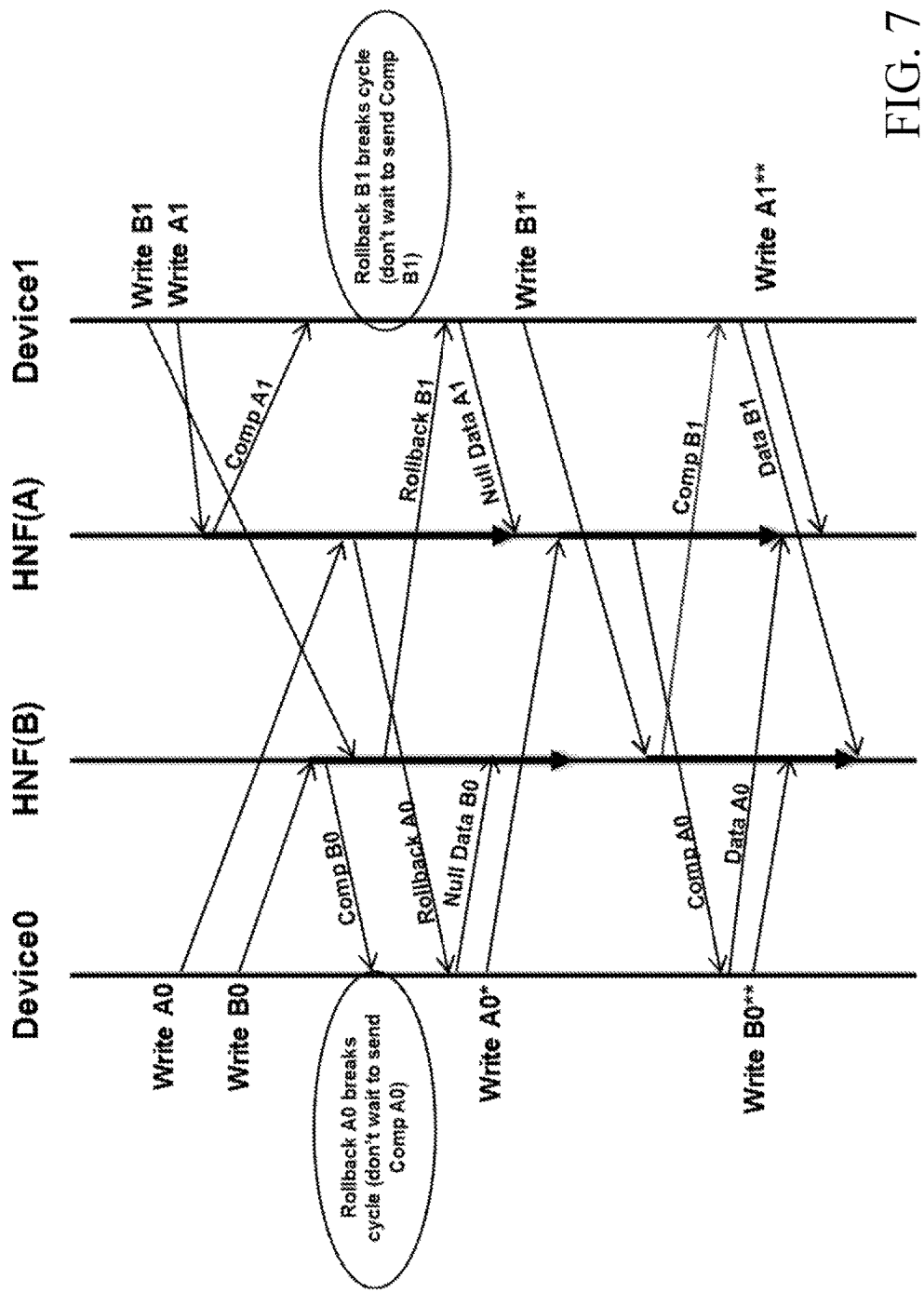

Referring now to FIG. 7, the deadlock situation of FIG. 5, can be resolved in situations where the CHI protocol governs multiple a PCIe devices. As in FIG. 5, FIG. 7 shows the order of writes by two PCIe devices where transaction A0 arrives at a home node (HNF), e.g., HNF(A) later than Transaction A1 and a Transaction B1 arrives at HNF(B) later than transaction B0. The home node detects this pattern and declares deadlock. HNF sends a "Rollback" message and RND sends Null Data for all requests newer than the one write request that was rolled back. RND replays all requests that were not completed prior to the rollback and the oldest write is non-speculative and subsequent writes wait for completion of oldest write, and are performed as TSO (speculative) writes, meaning that the writes are not committed until the Device sends a CompAck for the older write.

However, as shown in FIG. 7A the rollback of A0 breaks the cycle, denoted by reference 72a, as the device does not have to wait to send Comp A0 and the rollback of B1 breaks the cycle, denoted by reference 72b, as the device does not have to wait to send Comp A1, as also shown in the broken circular dependencies depicted in FIG. 5A.

Multiple states for the write allows establishing of an ordering point state, e.g., the point at which the order of a memory device is determined, e.g., the oldest write operation. This ordering point state is maintained at the PCIe interface and allows pipelining of writes to achieve high bandwidth. The commitment point for writes (where memory is changed) is also held in the PCIe device. Latency is increased only when and intermediate response referred to in the PCIe device as a "DBID" message, i.e., (data buffer ID) message is received at the PCIe interface in a different order than the write requests that were sent. This does happen in the mesh interface (due to different relative distances from the home nodes and variable delays due to mesh arbitration and congestion), but is relatively rare and the time interval of the out-of-order DBIDs is relatively short.

3 Additional Systems

Various features of the techniques described herein can be implemented on the multi-core processor based systems as described in U.S. Pat. Nos. 7,577,820, and 7,805,575, and commonly-owned U.S. patent application Ser. Nos. 12/028,002, 12/582,443, and 12/885,957, each of which is incorporated herein by reference in its entirety.

Various techniques described herein can be implemented in additional types of integrated circuit architectures. For example, some techniques can be used in an integrated circuit with a single processor core, or an integrated circuit in which multiple processor cores include respective computation units interconnected by a shared interconnection network such as a bus, or a pipelined bus, in addition to a tiled integrated circuit architecture in which multiple processor cores are interconnected by a network of switches connected to respective computation units. Some techniques can be used in parallel processing environments that include multiple processes executing on a single processor, or multiple single-core and/or multi-core processors.

It is to be understood that the foregoing description is intended to illustrate and not to limit the scope of the invention, which is defined by the scope of the appended claims. Other embodiments are within the scope of the following claims.

What is claimed is:

1. A compute node comprises:
a multicore processor device including:
a plurality of cores, with multiple ones of the plurality of cores each comprising a processor; and
switching circuitry configured to couple the processor to a network among the plurality of cores; the node configured to:
detect presence of a potential deadlock condition between a device that communicates with a node over a serial peripheral interconnect, and memory;
generate by the node in response to the detection of the potential deadlock condition, a transaction to cause the device to rollback all write transactions that are currently in progress at the serial peripheral interconnect to temporarily remove the write transactions from the serial peripheral interconnect; and
cancel the rolled back write transaction.

2. The node of claim 1 wherein the potential deadlock condition is a set of conditions that can result in a deadlock or can result in a false detection of the deadlock.

3. The node of claim 1 wherein the node configured to detect a potential deadlock is further configured to:
determine whether write requests to memory meet a known set of write patterns.

4. The node of claim 1 wherein the node configured to detect a potential deadlock is further configured to:
determine whether write requests to memory are to a device that prohibits results of write operations to become visible in a reverse order from the order that the write operations were generated.

5. The node of claim 1 wherein the node configured to detect a potential deadlock is further configured to:
determine whether write requests originate from plural, different serial peripheral interconnect devices with addresses to specific memory locations.

6. The node of claim 1 wherein the node configured to cancel the rolled back write transaction is further configured to:
send a null write transaction to complete a write transaction without modifying any data in memory.

7. A method comprising:
detecting presence of a potential deadlock condition between a device that communicates with a node over a serial peripheral interconnect, and memory;
generating by the node in response to the detection of the potential deadlock condition, a transaction to cause the device to rollback all write transactions that are currently in progress at the serial peripheral interconnect to temporarily remove the write transactions from the serial peripheral interconnect; and
cancelling the rolled back write transaction upon removal of the potential deadlock.

8. The method of claim 7 wherein the potential deadlock condition is a set of conditions that can result in a deadlock or can result in a false detection of the deadlock.

9. The method of claim 7 wherein detecting the potential deadlock further comprises:
determining whether write requests to memory meet a known set of write patterns.

10. The method of claim 9 wherein detecting the potential deadlock further comprises:
determining whether write requests to memory are to a device that prohibits results of write operations to become visible in a reverse order from the order that the write operations were generated.

11. The method of claim 9 wherein detecting the potential deadlock further comprises:
determining whether write requests originate from plural, different serial peripheral interconnect devices with addresses to specific memory locations.

12. The method of claim 7 wherein cancelling the rolled back write transaction further comprises:
sending a null write transaction to complete a write transaction without modifying any data in memory.

13. A computer program product for controlling a compute node, the computer program product tangibly stored on a non-transitory computer readable medium and comprising instructions to cause the compute node to:
detect presence of a potential deadlock condition between a device that communicates with the node over a serial peripheral interconnect and memory;
generate by the node in response to the detection of the potential deadlock condition, a transaction to cause the device to rollback all write transactions that are currently in progress at the serial peripheral interconnect to temporarily remove the write transactions from the serial peripheral interconnect; and
cancel the rolled back write transaction.

14. The computer program product of claim 13 wherein the potential deadlock condition is a set of conditions that can result in a deadlock or can result in a false detection of the deadlock.

15. The computer program product of claim 13 further comprising instructions to:
   determine whether write requests to memory meet a known set of write patterns.

16. The computer program product of claim 13 further comprising instructions to:
   determine whether write requests to memory are to a device that prohibits results of write operations to become visible in a reverse order from the order that the write operations were generated.

17. The computer program product of claim 13 further comprising instructions to:
   determine whether write requests originate from plural, different serial peripheral interconnect devices with addresses to specific memory locations.

18. The computer program product of claim 13 wherein to cancel the rolled back write transaction further comprises instructions to:
   send a null write transaction to complete a write transaction without modifying any data in memory.

* * * * *